United States Patent [19]

Gebhard

[11] Patent Number: 4,462,303
[45] Date of Patent: Jul. 31, 1984

[54] MULTIFUNCTION SAIL MIRROR

[75] Inventor: Harold C. Gebhard, Livonia, Mich.

[73] Assignee: Ford Motor Company, Dearborn, Mich.

[21] Appl. No.: 403,750

[22] PCT Filed: Jun. 1, 1982

[86] PCT No.: PCT/US82/00758
§ 371 Date: Jun. 1, 1982
§ 102(e) Date: Jun. 1, 1982

[87] PCT Pub. No.: WO83/04225
PCT Pub. Date: Dec. 8, 1983

[51] Int. Cl.³ .............................. B60H 1/00; B60R 1/06
[52] U.S. Cl. ........................................... 98/2; 98/2.04; 98/2.18
[58] Field of Search ........................... 98/2, 2.04, 2.18; 350/302, 307

[56] References Cited

U.S. PATENT DOCUMENTS 2,746,100  5/1956  Hallinger .............................. 98/2.04
3,859,899  1/1975  Mills .......................................... 98/2

FOREIGN PATENT DOCUMENTS 573190    3/1959   Canada ................................. 98/2.18
2024793  12/1971   Fed. Rep. of Germany ....... 98/2.18
3002134   7/1981   Fed. Rep. of Germany ....... 98/2.04

OTHER PUBLICATIONS

PCT/EP80/00120, 5-1981, Hagn et al., 98-2.

Primary Examiner—Harold Joyce
Attorney, Agent, or Firm—Daniel M. Stock; Clifford L. Sadler

[57] ABSTRACT

A sail mirror assembly 10 is provided which is operatively connected through ducting 16 to a source of heated air in an automobile heating and ventilating system. Doors 26, 64, 84 are selectively moveable by motors 68, 74 to effect operation in four modes: Mirror defrosting, side window defrosting, air extraction, and air induction.

4 Claims, 8 Drawing Figures

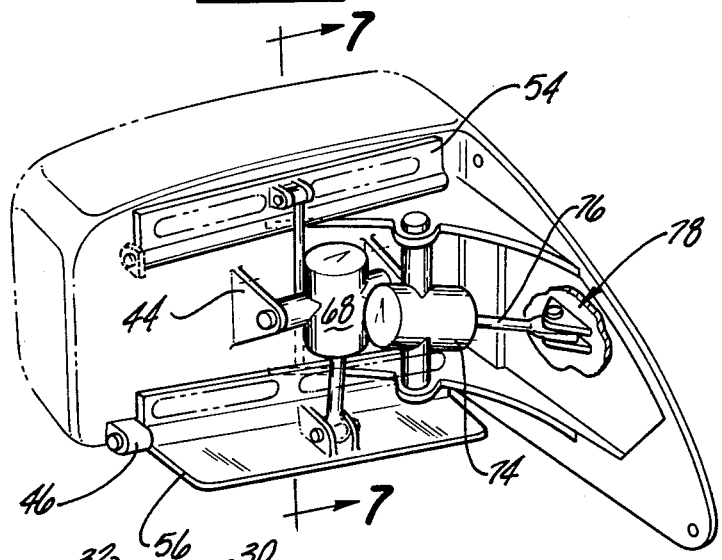
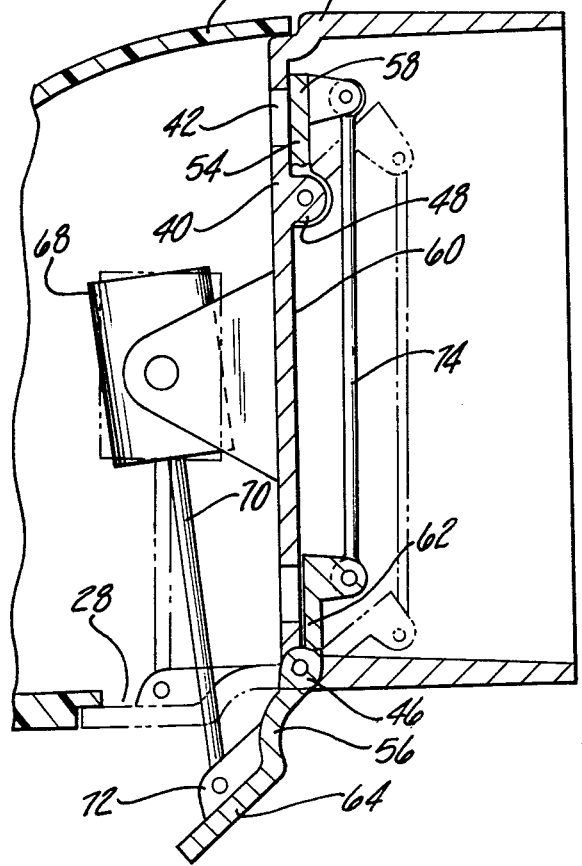

MULTIFUNCTION SAIL MIRROR

TECHNICAL FIELD

The present invention relates generally to outside rearview mirrors for automobiles and more specifically to a mirror of the type which is operatively connected to the heating and ventilating system of the automobile to directionally control air flow.

BACKGROUND ART

It is well known by designers of automobiles that the formation of water condensation on outside rearview mirrors and side windows is an undesirable phenomenon that causes inconvenience to drivers who must clear these surfaces to insure good visibility. It is also known that providing a ventilation path through the front edge of the vehicle's front doors as is conventionally accomplished with so-called vent windows is desirable in certain vehicles, particularly when air conditioning is not used.

The response of the automotive industry to provide components which will automatically remove condensation from one or the other of the mentioned glass surfaces or will provide a door ventilation path is well known. For example, U.S. Pat. Nos. 3,522,584 to Talbot; 3,859,899 to Mills; and 3,877,780 to Taylor disclose outside rearview mirrors which accomplish clearing of the mirror by passing heated passenger compartment air through it. That passing heated air over inside glass surfaces on which condensation may form is known is exemplified by U.S. Pat. No. 2,150,110 to Strauss et al. Lacking in the prior art, however, is teaching of the economical combination of any of these desirable functions in a single component assembly.

DISCLOSURE OF THE INVENTION

Responsive to the deficiencies in the prior art the present invention provides a sail mirror assembly operatively connected to a source of heated air in an automobile heating and ventilating system and including a plurality of doors with control means for directionally controlling air flow to, from, and through the body of the mirror assembly. The invention sail mirror assembly is operable in four modes: mirror defrosting, side window defrosting, air extraction, and air induction.

BRIEF DESCRIPTION OF THE DRAWINGS

The present invention can be understood by those skilled in the art by reading the accompanying description of the best mode for carrying out the invention with reference to the accompanying sheets of drawings in which:

FIG. 6 is a rear perspective view of the invention sail mirror assembly;

FIG. 7 is a cross-sectional view taken along line 7—7 of FIG. 6; and

BEST MODE OF CARRYING OUT THE INVENTION

Turning now to the drawings, and in particular to FIGS. 1–4, a sail mirror assembly 10 is illustrated as being assembled to a door 12 of an automobile vehicle body 14 adjacent the leading edge of the door near the lower front corner of the side window known as the sail area because of its sail-like shape.

Figure 1:
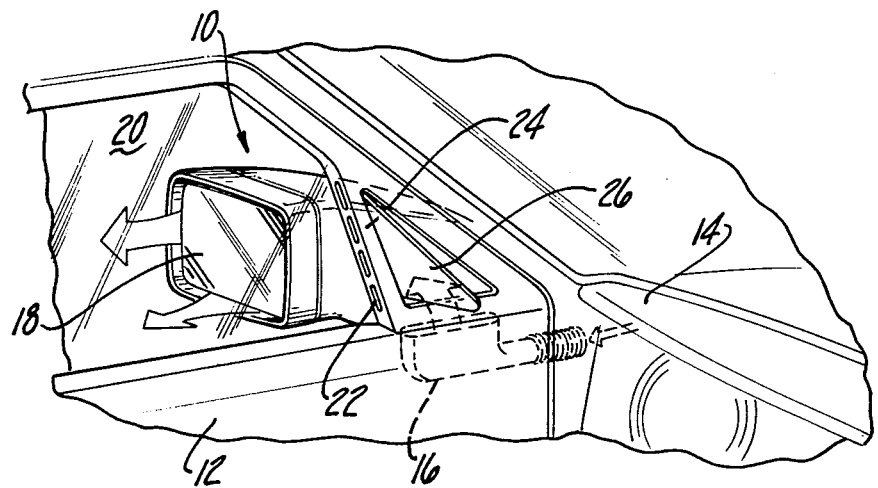
FIG. 1 is a perspective view of the sail mirror assembly of the present invention installed in an automobile in which the mirror defrosting mode of operation is illustrated.

FIGS. 1–4 illustrate four functions performed by the sail mirror assembly 10 of the present invention. In FIG. 1 a mirror defrosting mode of operation is illustrated. Heated air from the heating system of the vehicle (not shown) is ported to the sail mirror assembly 10 through a known flexible conduit 16. The heated air flows in the direction of the arrows of FIG. 1 to enter the body of the sail mirror assembly 10, as will be described in more detail to follow, and exits around the periphery of the mirror 18 of sail mirror assembly 10.

Figure 2:
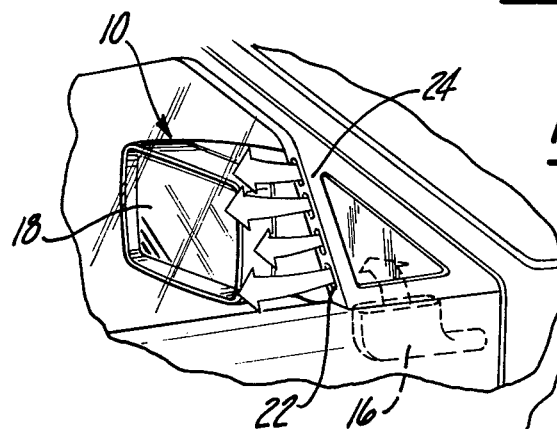
FIG. 2 is a perspective view of the sail mirror assembly of the present invention installed in an automobile in which the side window defrosting mode of operation is illustrated.

In FIG. 2 a side window defrosting mode of operation is illustrated. In this mode of opertion heated air is again passed through the flexible duct 16 and is passed along the surface of the side window glass 20 through ports 22 formed in a portion of the vehicle door 12, such as the substantially vertical division bar 24.

Figure 3:
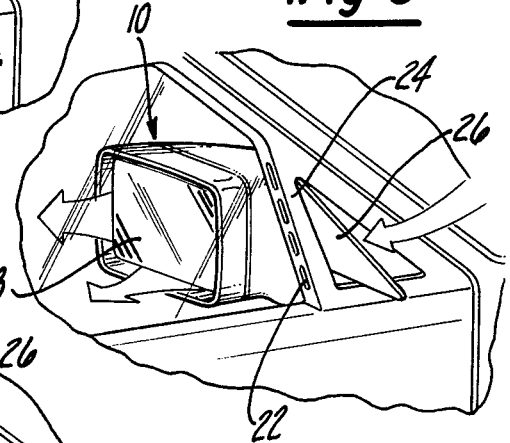
FIG. 3 is a perspective view of the sail mirror assembly of the present invention installed in an automobile in which the air extraction mode of operation is illustrated.

In FIG. 3 an air extraction mode of operation is illustrated. In this mode of operation no use is made of heated air, but a pivotally mounted door assembly 26 is opened to provide communication between the body of the sail mirror assembly 10 and the interior of the vehicle body. Reduced air pressure created adjacent the periphery of the mirror 18 during forward motion of the vehicle promotes the flow of air from the vehicle passenger compartment to the exterior around the periphery of the mirror 18.

Figure 4:
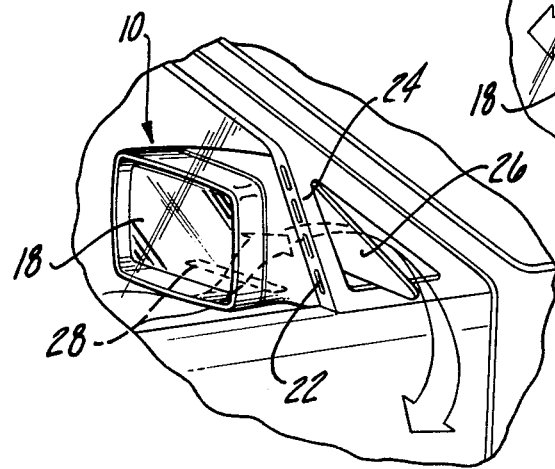
FIG. 4 is a perspective view of the sail mirror assembly of the present invention installed in an automobile in which the air induction mode of operation is illustrated.

FIG. 4 illustrates a ventilation mode of operation in which fresh air from outside the vehicle is introduced into the vehicle passenger compartment through the body of the sail mirror 10. In this mode of operation a slot, shown in dotted line at 28, is opened to the outside by means to be later described in detail, and air is passed in the direction of the arrows through the body of the sail mirror and through the pivotally mounted door 26 to the interior of the vehicle passenger compartment.

Turning now to FIGS. 5–8 of the drawing, the advantageous construction of the sail mirror of the present invention can be appreciated. As can best be seen in FIG. 5, the sail mirror assembly 10 includes a body portion 30 and a cover portion 32 which may be conventionally secured thereto by fasteners, such as screws indicated at 34. The body 30 is illustrated as including an attaching portion 36 configured to abuttingly engage a portion of the vehicle door 12 to which it may be secured by suitable fastening means. A generally triangularly shaped aperture 38 is formed through the attaching portion 36 to register with the door 26. Extending generally perpendicularly outwardly from the attaching portion 36 is an inner wall 40. Perforations, such as the elongated slots indicated at 42, are formed through the wall 40 to permit the passage of air therethrough around the periphery of the mirror 18. A pair of spaced inwardly extending mounting bosses 44 having axially aligned apertures 45 are formed on the inner surface of inner wall 40. Likewise extending inwardly from the inner face of wall 40 are a pair of mounting ears having aligned apertures 47. A similar pair of spaced apertured mounting ears 48 extend outwardly from the front face of the inner wall 40, as is indicated in dotted line in FIG. 5. A pair of vertically spaced generally triangular braces 50 join the attached portion 36 and inner wall 40. Apertured ears 52, which are arranged in axial alignment, extend generally inwardly from these braces.

Figure 5:
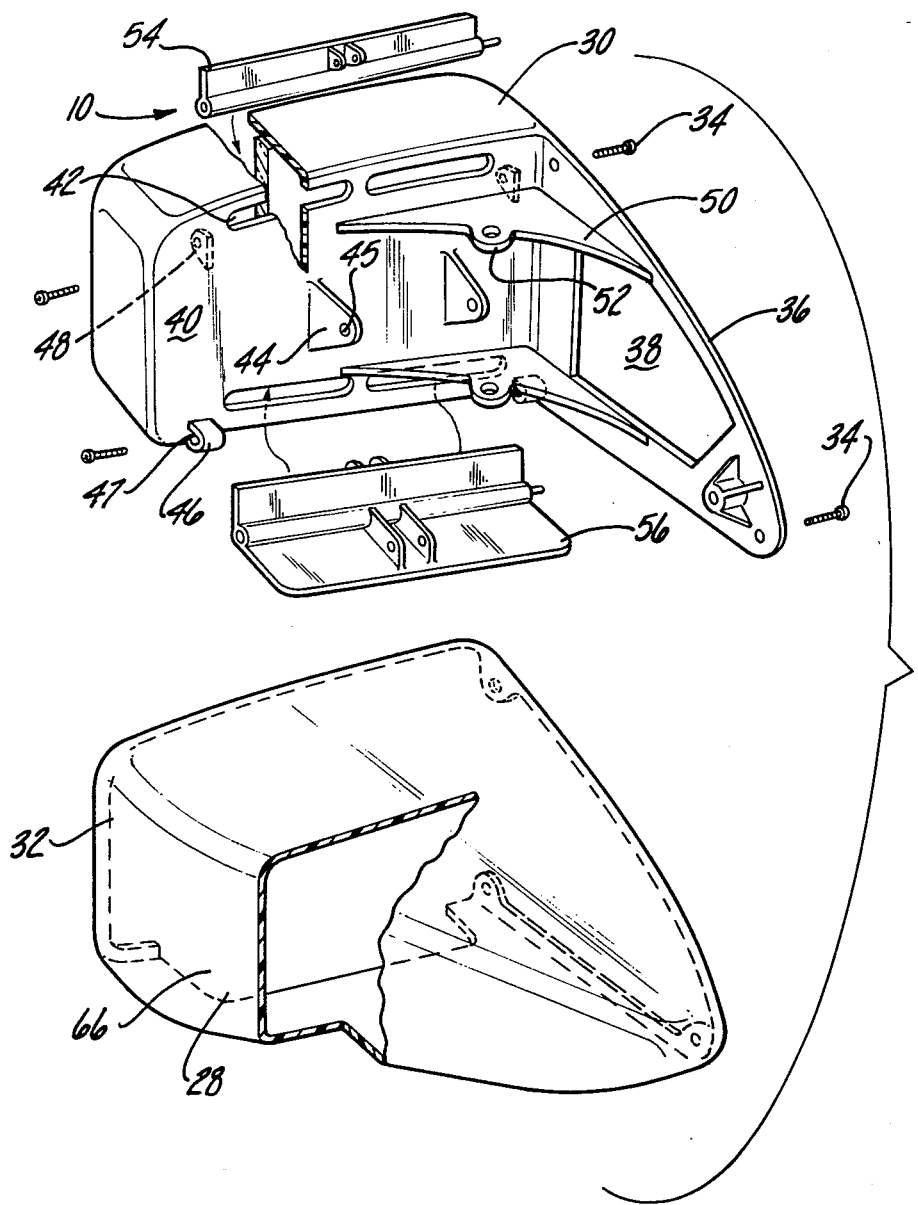
FIG. 5 is an exploded rear perspective view of the invention sail mirror assembly with certain parts removed for clarity.

Also shown in the exploded view of FIG. 5 is an upper door 54 which is pivotally mounted between the ears 48 and a lower door 56 which is pivotally mounted between the ears 46. The upper door 54 mounting is effected in close relationship with the upper pair of slots 42 while the mounting of the lower door 56 is in close relationship with the lower pair of slots 42 formed through the inner wall 40. The upper door 54, as best may be seen in FIG. 7, includes a flat closure portion 58 engageable with the outer surface 60 of the inner wall 40 to effect closure of the upper pair of slots 42. The lower door 56 similarly has a flat portion 62 engageable with the surface 60 for closing the lower pair of ports 42. The lower door 56 further includes an outer door portion 64 extending outwardly from the pivotal axis defined by mounting ears 46 in the direction opposite that of the sealing portion 62. This outer door 64 is operative in one position shown in dotted line in FIG. 7 to close the aperture 28 formed in the cover 32 at a position spaced inwardly from the wall 40.

As may best be seen in FIGS. 6 and 7, the mounting and operation of the doors 26, 54 and 56, 64 can be appreciated. A known drive motor 68 is trunion mounted in the support braces 44 and includes a linearly displaceable output actuating rod 70 which is pivotally mounted, as indicated at 72, to the outside door 64. A pivotally mounted cross link 74 between upper door 54 and lower door 56 effects simultaneous movement of the two doors. As best can be appreciated from the two-position drawing of FIG. 7, movement tending to open the outside door 64, as shown in solid line of FIG. 7, effects closure of the slots 42 through operation of upper and lower doors 54, 56. Conversely, movement to the dotted line position of FIG. 7, wherein the aperture 28 of cover member 32 is closed by outside door 64, effects movement of upper and lower doors 54, 56 to the position opening slots 42.

A second known drive motor 74 is trunion mounted between the ears 52 of braces 50 and includes a linear actuating rod 76 which is pivotally mounted to the sail door 26, as indicated at 78.

Figure 8:
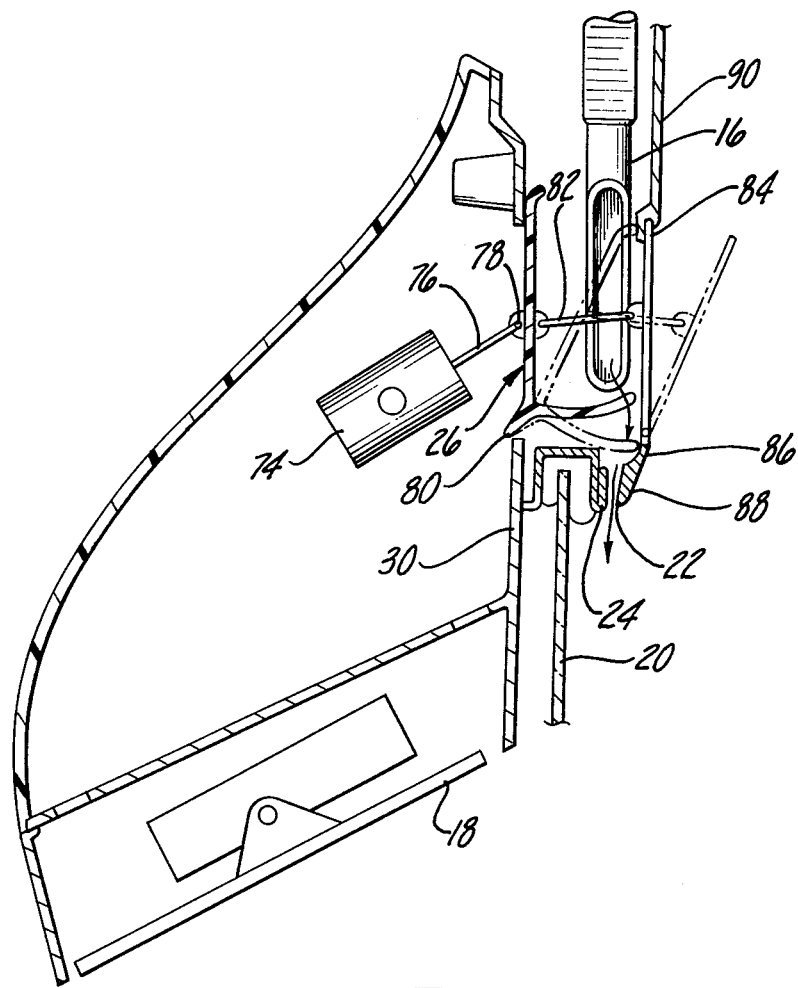
FIG. 8 is a horizontal cross-sectional view of the invention sail mirror assembly.

Turning now to FIG. 8, the sail door assembly 26 is shown to be configured to include a generally "L"-shaped member attached through a hinge 80 to the body 30. A cross link 82 pivotally connected to one side of the L-shaped member is similarly pivotally connected to an inner door 84 through which direct communication to the vehicle passenger compartment is effected. The inner door 84 is hinged at 86 and includes a hinge body portion 88 through which the ducts 22 are formed adjacent the side glass 20. Closure of the inner door 88 is effected through engagement with a sealing portion 90 of the vehicle body. As can be seen from FIG. 8, movement between the solid line closed position and the dotted line open position of the doors 26, 84 effects directional control of air between the position wherein communication is established between the duct 16 and the slots 22 and the position wherein communication is effected between the duct 16 and the interior of the body 30 while slots 22 are closed.

It will be clear from the foregoing that the mirror defrosting mode of FIG. 1 is effected when the vehicle heating system is on and the door assembly 26 is positioned as shown in dotted line in FIG. 8 while the external door 64 is closed and the upper and lower slots 42 are opened. Movement of the door assembly 26 from this position to the solid line position of FIG. 8 effects the side window defrosting mode of FIG. 2. The air extraction mode of FIG. 3 is effected by opening the door assembly 26 to the passenger compartment while the external door 64 is closed; and the ventilation mode of FIG. 4 is effected through opening both the door assembly 26 and the external door 64.

While only one embodiment of the invention sail mirror assembly 10 has been described, those skilled in the art will appreciate that others are possible without departing from the scope of the appended claims.

INDUSTRIAL APPLICABILITY

The present invention finds its best use as a sail mirror assembly for automotive vehicles.

I claim:

1. In an automotive vehicle body having a windowed side door for enclosing a passenger compartment including a generally triangular sail area at the leading edge of the window bounded on its rear edge by a substantially vertical division bar, an improved sail mirror assembly of the type having a generally hollow housing carrying a mirror and fixed to the side door in registration with the sail area and including means for passing air heated by the vehicle heating system from the passenger compartment to the mirror, characterized in that:
   A. flexible conduit means are provided having one end connected to the vehicle heating system and the other, open end positioned within the side door adjacent the sail area;
   B. means defining a flow path through the hollow housing around the mirror are provided;
   C. a plurality of slots are formed through portions of the vehicle door proximate the division bar adjacent the inner surface of the side window;
   D. first and second aligned apertures are formed through the mirror housing and the vehicle door, respectively;
   E. a first door member is pivotally mounted adjacent the first aperture and includes a portion engageable with the division bar slots and is selectively movable between a first position wherein the first aperture is closed and the division bar slots and the conduit open end are in fluid communication and a second position wherein the first aperture is open and the division bar slots are closed; and
   F. a second door member is pivotally mounted adjacent the second aperture and is selectively movable by first control means in unison with the first door member between a first position, coinciding with said first door first portion wherein the second aperture is closed and a second position wherein said second aperture is open.

2. A sail mirror assembly according to claim 1 further characterized in that a third aperture is formed through the mirror housing for communication with the outside, a third door member is pivotally mounted adjacent the third aperture, flap means are pivotally mounted adjacent the housing flow path defining means, and second control means are provided for selectively operating the third door member and the flap means in unison for movement between a ventilating position wherein the third door member opens the third aperture and the flap means closes the housing flow path defining means and an air induction position wherein the third door member closes the third aperture and the flap means opens the housing flow path defining means.

3. A sail mirror assembly as defined in claims 1 or 2 further characterized in that the first control means comprises a selectively operable motor drive means carried in the mirror housing and having an axially displaceable output rod member pivotally connected to the first door member, and a linking rod member pivotally connected between the first and second rod member.

4. A sail mirror assembly as defined in claim 2 further characterized in that the second control means comprises another selectively motor drive means carried in the mirror housing and having an axially displaceable output rod member pivotally connected to the third door member, and linkage means pivotally connected between the third door member and the flap means.

* * * * *